US012807832B2

(12) United States Patent
Katou

(10) Patent No.: US 12,807,832 B2
(45) Date of Patent: Nov. 24, 2026

(54) COATING FILM AND METHOD FOR FORMING THE SAME

(71) Applicant: Panasonic Intellectual Property Management Co., Ltd., Osaka (JP)

(72) Inventor: Ryou Katou, Aichi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 1045 days.

(21) Appl. No.: 17/824,040

(22) Filed: May 25, 2022

(65) Prior Publication Data

US 2022/0389263 A1 Dec. 8, 2022

(30) Foreign Application Priority Data

Jun. 3, 2021 (JP) ................................ 2021-093388

(51) Int. Cl.

| | |
|---|---|
| ***C09D 123/28*** | (2006.01) |
| ***C09D 5/16*** | (2006.01) |
| ***C09D 7/61*** | (2018.01) |

(52) U.S. Cl.

CPC ....... *C09D 123/286* (2013.01); *C09D 5/1681* (2013.01); *C09D 7/61* (2018.01)

(58) Field of Classification Search

None

See application file for complete search history.

(56) References Cited

U.S. PATENT DOCUMENTS

2017/0204279 A1* 7/2017 Larimer .................. C09D 5/00

FOREIGN PATENT DOCUMENTS

| | | | | |
|---|---|---|---|---|
| JP | 2005-179402 | A | | 7/2005 |
| JP | 2016166295 | A | * | 9/2016 |

OTHER PUBLICATIONS

Nishihata et al., JP-2016166295-A, Sep. 15, 2016 (machine translation) (Year: 2016).*

* cited by examiner

*Primary Examiner* — Cheng Yuan Huang

(74) *Attorney, Agent, or Firm* — Renner, Otto, Boisselle & Sklar LLP

(57) ABSTRACT

A coating film and a method for forming the same are provided. The coating film controls reduction in repellency of hydrophobic fine particles and increases rub fastness of the coating film. The coating film includes a ground layer containing thermoplastic resin (chlorinated polyolefin or acid modified chlorinated polyolefin, for example) and an upper layer containing hydrophobic fine particles (hydrophobic silica particle or silicone resin particle, for example) formed on the ground layer. Parts of the hydrophobic fine particles contained in the upper layer are buried in the ground layer.

5 Claims, 11 Drawing Sheets

【Fig.1】
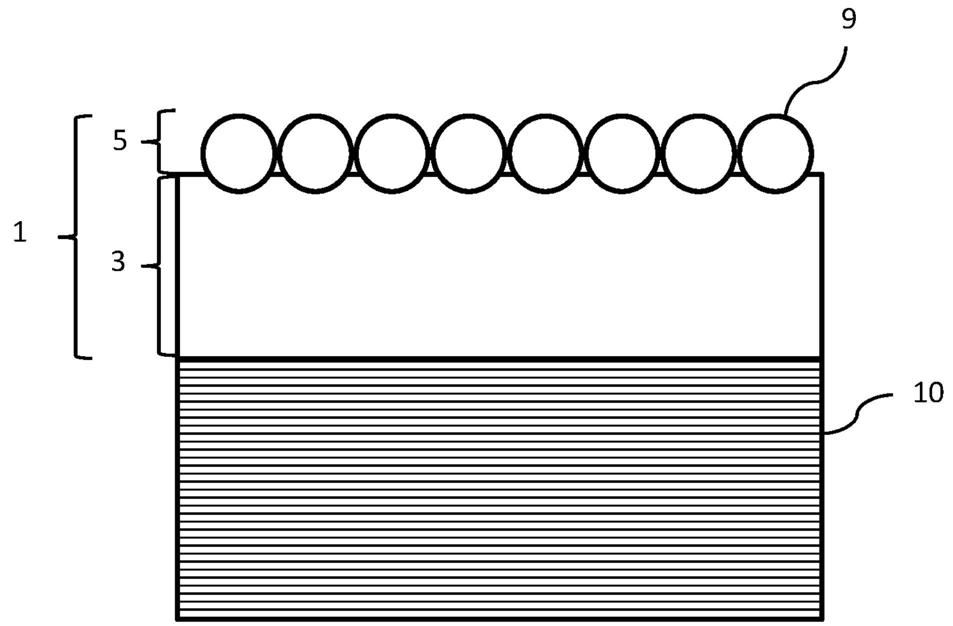

【Fig.2】
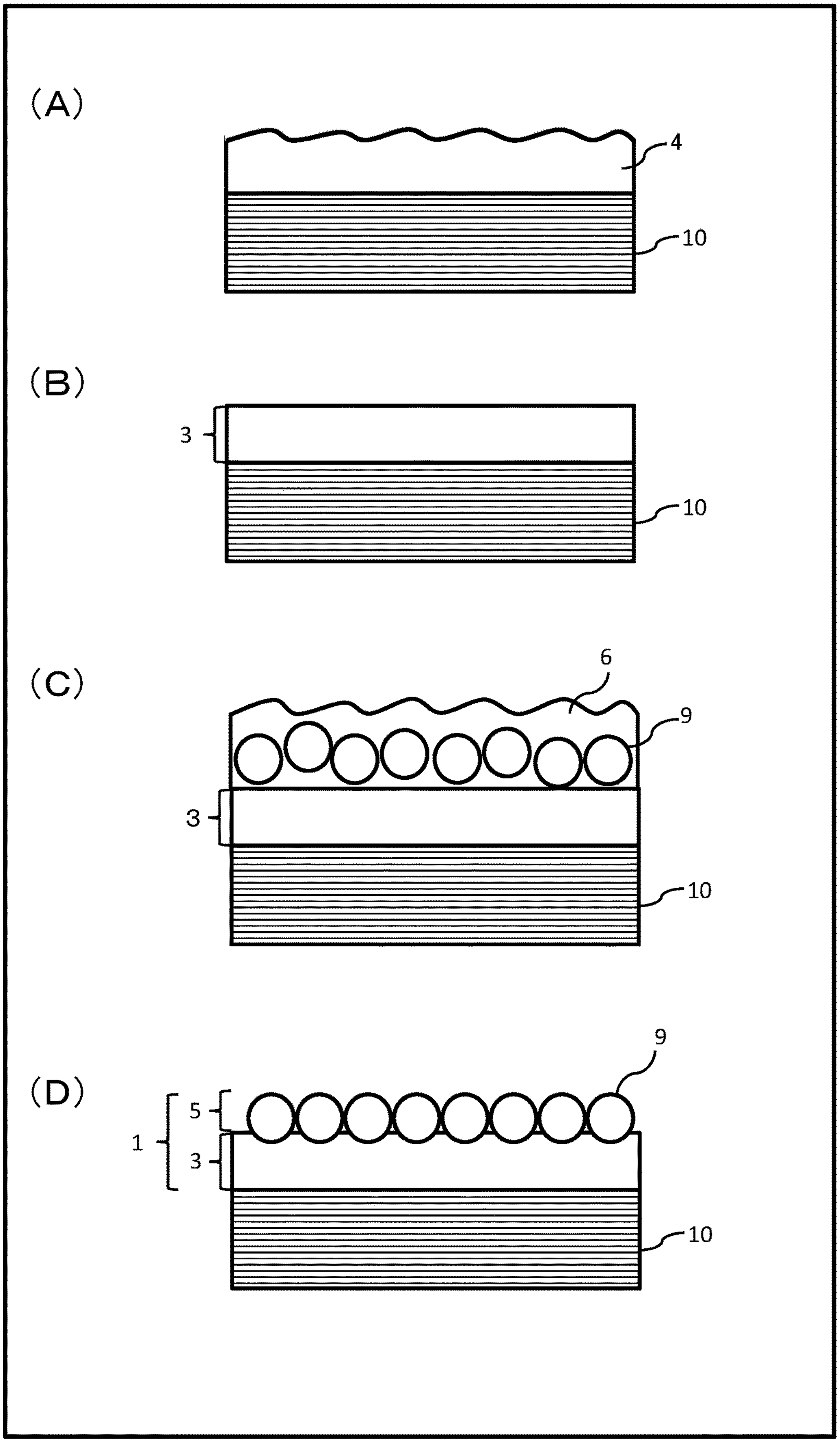

【Fig.3】

| Coating agent 2 | |
|---|---|
| First coating agent 4 | Binder resin solution |
| | Solvent |
| Second coating agent 6 | Hydrophobic fine particles 9 |
| | Solvent |

【Fig.4】

| | | | Example 1 | Example 2 | Example 3 | Example 4 | Example 5 | Example 6 |
|---|---|---|---|---|---|---|---|---|
| Coating agent 2 | First coating agent 4 | Binder resin solution (%) | Acid modified chlorinated polyolefin (30%) | | | Chlorinated polyolefin (50%) | Acid modified chlorinated polyolefin (30%) | |
| | | Solvent (%) | Toluene (70%) | | | Toluene (50%) | Toluene (70%) | |
| | Second coating agent 6 | Hydrophobic fine particle | Hydrophobic silica particle (particle size: 40nm) | Hydrophobic silica particle (particle size: 7nm) | | | Silicon resin particle (particle size: 2μm) | Silicon resin particle (particle size: 10μm) |
| | | Hydrophobic fine particle (%) | 1% | | | | | |
| | | Binder resin solution (%) | - | - | - | - | - | - |
| | | Solvent (%) | Ethanol (99%) | Ethanol (99%) | Ethanol (40%) | Ethanol (40%) | Toluene (99%) | Toluene (99%) |
| | | | - | - | Water (59%) | Water (59%) | - | - |
| Drying condition | Air drying | Rub fastness | medium | failure | low | low | high | high |
| | | Repellency | medium | high | high | high | medium | medium |
| | | Contact angle | 127° | 167° | 167° | 164° | 96° | 116° |
| | | Tested repellency | low | low | low | low | medium | medium |
| | Heat drying | Rub fastness | medium | medium | medium | high | high | high |
| | | Repellency | medium | high | high | medium | medium | medium |
| | | Contact angle | 107° | 167° | 167° | 103° | 102° | 114° |
| | | Tested repellency | low | low | low | low | medium | medium |

【Fig.5】

| | | | Comparative example 1 | Comparative example 2 | Comparative example 3 | Comparative example 4 | Comparative example 5 |
|---|---|---|---|---|---|---|---|
| Coating agent 2 | First coating agent 4 | Binder resin solution (%) | - | - | - | Chlorinated polyolefin aqueous emulsion (100%) | Acid modified chlorinated polyolefin (30%) |
| | | Solvent (%) | - | - | - | - | toluene (70%) |
| | Second coating agent 6 | Hydrophobic fine particle | Hydrophobic silica particle (particle size: 7nm) | | | | |
| | | Hydrophobic fine particle (%) | 1% | 1% | 1% | 1% | 1% |
| | | Binder resin solution (%) | - | Fluorocarbon resin (20%) | Chlorinated polyolefin aqueous emulsion (10%) | - | - |
| | | Solvent (%) | Ethanol (40%) | Ethanol (79%) | Ethanol (40%) | Ethanol (40%) | Toluene (99%) |
| | | | Water (59%) | - | Water (49%) | Water (59%) | - |
| Drying condition | Air drying | Rub fastness | failure | medium | failure | failure | medium |
| | | Repellency | high | low | low | failure | low |
| | | Contact angle | 167° | 132° | 164° | 10° | 132° |
| | | Tested repellency | failure | failure | failure | failure | failure |
| | Heat drying | Rub fastness | failure | medium | failure | high | high |
| | | Repellency | high | low | low | failure | low |
| | | Contact angle | 167° | 128° | 164° | 11° | 132° |
| | | Tested repellency | failure | failure | failure | failure | failure |

【Fig.6】
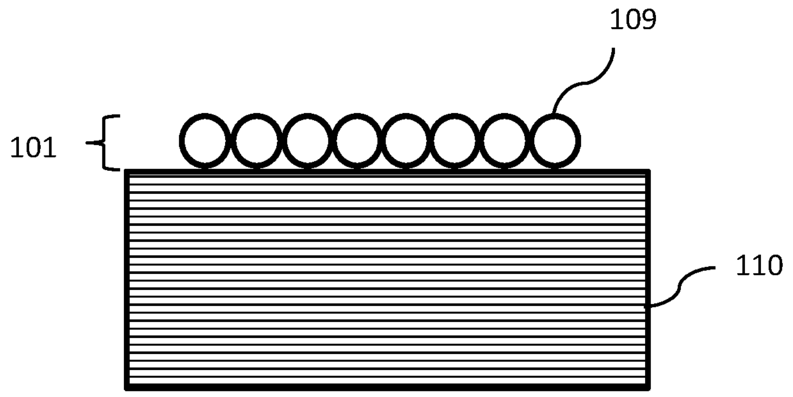

【Fig.7】
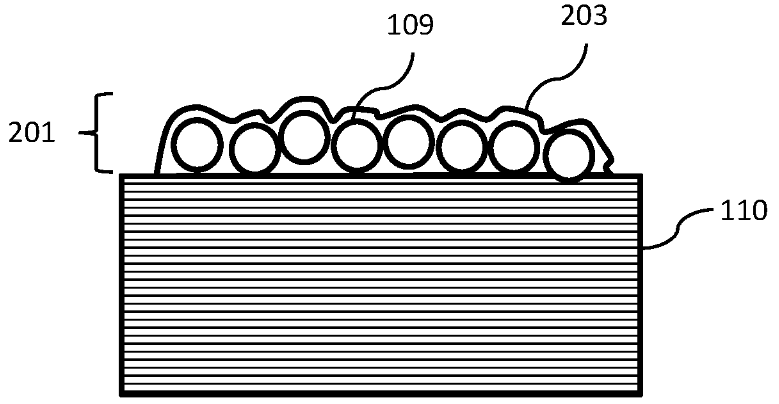

【Fig.8】
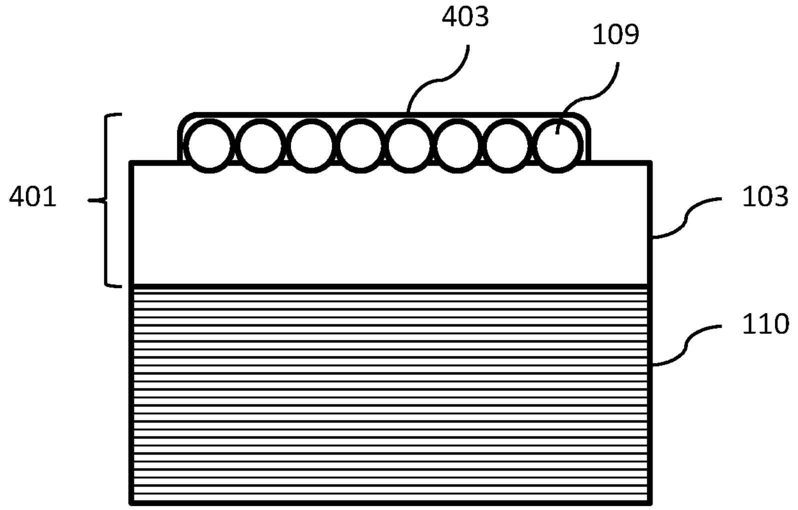

【Fig.9】
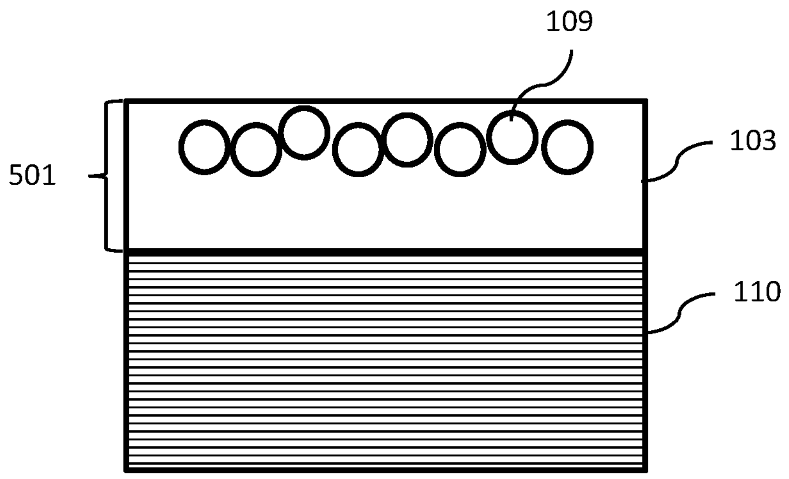

【Fig.10】
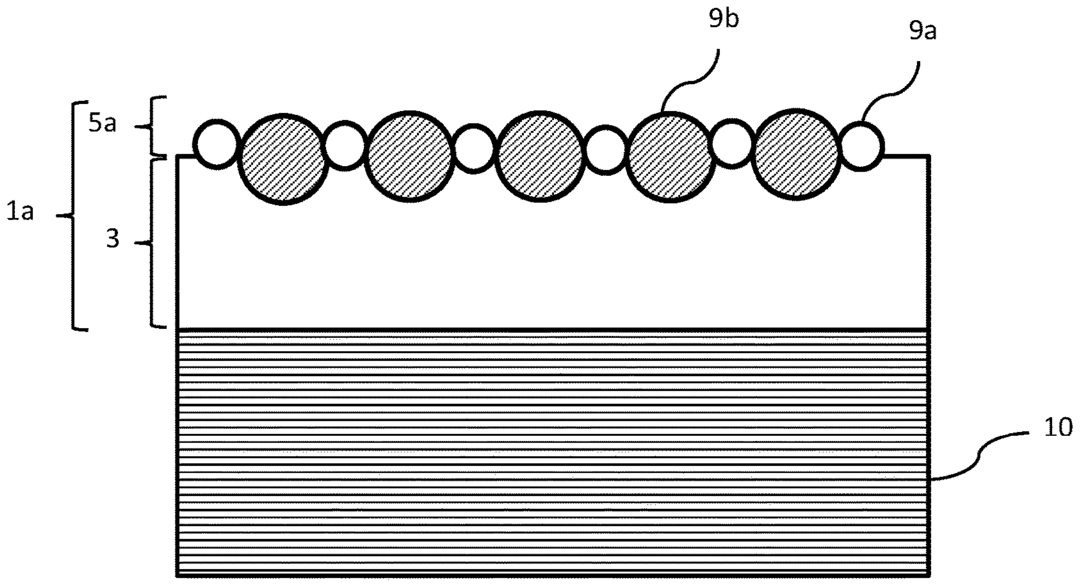

【Fig.11】

| | | | Example 7 |
|---|---|---|---|
| Coating agent 2 | First coating agent 4 | Binder resin solution (%) | Acid modified chlorinated polyolefin (30%) |
| | | Solvent (%) | Toluene (70%) |
| | Second coating agent 6a | Hydrophobic fine particle | Hydrophobic silica particle (particle size: 7nm) + Silicon resin particle (particle size: 10μm) |
| | | Hydrophobic fine particle (%) | 1% + 1% |
| | | Binder resin solution | - |
| | | Solvent (%) | Ethanol (40%) |
| | | | Water (58%) |
| Drying condition | Air drying | Rub fastness | low |
| | | Repellency | high |
| | | Contact angle | 164° |
| | | Tested repellency | medium |
| | Heat drying | Rub fastness | medium |
| | | Repellency | high |
| | | Contact angle | 164° |
| | | Tested repellency | medium |

COATING FILM AND METHOD FOR FORMING THE SAME

TECHNICAL FIELD

The present prevention relates to a coating film for giving repellency to a surface of an object and a method for forming the coating film.

BACKGROUND ART

PTL 1 discloses a conventional method for giving repellency to a surface of a base material. The conventional method has proposed application of fluorocarbon silane hydrolysate containing aqueous emulsion and a covering (coating film) having oil resistance and antifouling properties and water/oil repellency.

Specifically, the method disclosed in PTL 1 gives the repellency to the surface of the base material by applying an aqueous emulsion containing fluorocarbon silane, surfactant and metal oxide particles as a dispersion stabilizer (pH adjuster) and then drying the aqueous emulsion to form the covering on the surface of the base material.

CITATION LISTS

Patent Literatures

JP 2005-179402A

SUMMARY OF THE INVENTION

Unfortunately, the above conventional covering contains not only repellent fluorocarbon silane, but also additives such as surfactant for a film formation, resulting in reducing the repellency of the fluorocarbon silane due to the additives. Rubbing a surface of a base material during use causes separation of the covering from the surface of the base material, resulting in reducing the repellency.

The present invention solves the conventional problem described above and intends to provide a coating film and a method for forming the same to control reduction in the repellency of hydrophobic fine particles and increase rub fastness of the coating film.

To achieve objects described above, the coating film according to the present invention includes a ground layer containing thermoplastic resin and an upper layer containing the hydrophobic fine particles to be formed on a surface of the ground layer. Parts of the hydrophobic fine particles contained in the upper layer are buried in the ground layer. Thus, the objects are achieved.

The coating film according to the present invention is formed by following steps: (i) applying the thermoplastic resin dissolved in a solvent onto a surface of a target object and drying the solvent containing the thermoplastic resin to form the ground layer on the surface of the target object, (ii) applying the hydrophobic fine particles dissolved in another solvent onto the surface of the ground layer, and (iii) drying the solvent containing the hydrophobic fine particles previously applied onto the surface of the ground layer to form the upper layer. According to the method for forming the coating film described above, the parts of the hydrophobic fine particles are buried in the ground layer formed on the surface of the target object. Thus, the objects are achieved.

The present invention provides the coating film as well as the method for forming the same to simultaneously control the reduction in the repellency of the hydrophobic fine particles and increase the rub fastness of the coating film.

BRIEF DESCRIPTION OF DRAWINGS

FIG. 1 is a schematic cross-sectional view of a coating film according to a first embodiment of the present invention.

FIG. 2 is a schematic cross-sectional view of a forming process of the coating film according to the first embodiment of the present invention.

FIG. 3 is a composition diagram of a coating agent according to the first embodiment and a second embodiment of the present invention.

FIG. 4 illustrates a summary of detailed testing conditions and evaluation results of each of the coating films according to a first example through a sixth example.

FIG. 5 illustrates a summary of detailed testing conditions and evaluation results of each of the coating films according to a first comparative example through a fifth comparative example.

FIG. 6 is a schematic cross-sectional view of a coating film according to the first comparative example.

FIG. 7 is a schematic cross-sectional view of a coating film according to the second comparative example and the third comparative example.

FIG. 8 is a schematic cross-sectional view of a coating film according to the fourth comparative example.

FIG. 9 is a schematic cross-sectional view of a coating film according to the fifth comparative example.

FIG. 10 is a schematic cross-sectional view of a coating film according to a second embodiment of the present invention.

FIG. 11 illustrates a summary of detailed testing conditions and evaluation results of a coating film according to a seventh example.

DESCRIPTION OF THE EMBODIMENTS

A coating film according to the present invention includes a ground layer containing thermoplastic resin and an upper layer containing hydrophobic fine particles to be formed on a surface of the ground layer. Parts of the hydrophobic fine particles contained in the upper layer are buried in the ground layer.

According to such a configuration, the hydrophobic fine particles having repellency are fixed on the ground layer because the parts of the hydrophobic fine particles are buried in the ground layer. Remaining parts of the hydrophobic fine particles expose their surfaces on the surface of the ground layer without being covered by components such as surfactant, which reduces the repellency. Thus, the coating film controls reduction in the repellency of the hydrophobic fine particles and increases rub fastness.

The coating film according to the present invention has a surface area of each of the parts of the hydrophobic fine particles smaller than that of each of the remaining parts of the hydrophobic fine particles. Then, the hydrophobic fine particles are arranged on the ground layer with the parts of the hydrophobic fine particles buried in the ground layer while the ground layer is hardly exposed. Thus, water is less likely to penetrate through the ground layer, which is non-repellent, resulting in the coating film of high repellency.

The coating film according to the present invention contains at least either hydrophobic silica particles or silicone resin particles as the hydrophobic fine particles. Thus, at least the hydrophobic silica particles or the silicone resin particles are exposed on a surface of a target object, resulting in the coating film of high repellency.

The coating film according to the present invention has a percentage of an exposed area of the ground layer in an entire area of the ground layer is 10% or less when viewed from above the upper layer. Thus, even though the ground layer is some exposed, the repellency is hardly reduced with the parts of the hydrophobic fine particles buried in the ground layer, resulting in the coating film of high repellency.

The coating film according to the present invention may contain at least two types of the hydrophobic fine particles of different mean particle sizes. The surface area of each of the parts of the hydrophobic fine particles in contact with the ground layer increases as each of the mean particle sizes of the hydrophobic fine particles increases. As such, two types of the hydrophobic fine particles are less likely to separate from the ground layer than only one type of the hydrophobic fine particles and the rub fastness of the coating film increases, resulting in the coating film of lasting repellency.

The coating film according to the present invention contains acid modified chlorinated polyolefin as the thermoplastic resin. A polar group contained in the acid modified chlorinated polyolefin and each of the hydrophobic fine particles indirectly bind with each other, resulting in the coating film of high rub fastness.

The hydrophobic fine particles contained in the coating film according to the present invention each have a smooth spherical shape. As such, water is less likely to accumulate on surfaces of the hydrophobic fine particles of smooth spherical shape than those of tabular or concave coating films or those of tabular or concave particles and of uneven spherical particles, resulting in the coating film of higher repellency.

A method for forming the coating film according to the present invention includes following first to third steps: (i) first step of applying the thermoplastic resin dissolved in a solvent onto the surface of the target object and drying the solvent containing the thermoplastic resin to form the ground layer on the surface of the target object, (ii) second step of applying the hydrophobic fine particles dissolved in another solvent onto the surface of the ground layer, and (iii) third step of drying the solvent containing the hydrophobic fine particles previously applied onto the ground layer to form the upper layer. Through the order of these steps, the coating film is formed on the surface of the target object with the parts of hydrophobic fine particles buried in the ground layer. Thus, the hydrophobic fine particles are fixed on the ground layer of the coating film without the reduction in the repellency of the hydrophobic fine particles.

The method for forming the coating film according to the present invention heats and dries the solvent containing the hydrophobic fine particles at a temperature higher than a softening point of the thermoplastic resin to soften the thermoplastic resin in the third step. Then, the hydrophobic fine particles are readily buried in the ground layer. The method increases the rub fastness of the coating film.

Embodiments of the present invention will now be described hereinafter with reference to the accompanying drawings.

First Embodiment

A coating film according to a first embodiment of the present invention will now be described with reference to FIG. 1. FIG. 1 is a schematic cross-sectional view of coating film 1 according to the first embodiment of the present invention.

Coating film 1 is formed on a surface of target object 10 and gives repellency to the surface of target object 10. Coating film 1 includes ground layer 3 and upper layer 5. As details will be described later, ground layer 3 is a film formed by applying first coating agent 4 onto the surface of target object 10 and drying first coating agent 4. Upper layer 5 is another film by formed by applying second coating agent 6 onto a surface of ground layer 3 and drying second coating agent 6. First coating agent 4 and second coating agent 6 may be correctively referred to as coating agent 2 hereinafter.

Target object 10, which coating film 1 is formed on, may be products or components requiring the repellency or rub fastness. They may be a fan, a blower, an impeller of the fan or the blower, an air passageway surrounding the impeller of the fan or the blower, a louver, a bath inner wall, and a traffic sign. Target object 10 may be made of plastic, glass, metal or wood, for example.

A thickness of coating film 1 is a sum of thicknesses of ground layer 3 and each of remaining parts of hydrophobic fine particles 9 contained in upper layer 5.

The remaining parts of hydrophobic fine particles 9, which are described later, are exposed on a top surface of ground layer 3 in coating film 1 formed on target object 10. A bottom surface of ground layer 3 in coating film 1 contacts with the surface of target object 10.

Ground layer 3 is formed by applying first coating agent 4 onto the surface of target object 10 and drying first coating agent 4 (Refer to FIG. 3). Ground layer 3 serves as a binder to fix hydrophobic fine particles 9 contained in upper layer 5. The parts of hydrophobic fine particles 9 are buried and fixed on ground layer 3 while the remaining parts are exposed. As such, ground layer 3 fixes hydrophobic fine particles 9 on target object 10 to give the repellency and the rub fastness to target object 10. In other words, ground layer 3 serves as the binder, that is, the bottom surface of ground layer 3 adheres to the surface of target object 10, and the top surface of ground layer 3 adheres to upper layer 5. Target object 10 and upper layer 5 indirectly adhere to each other across ground layer 3.

Ground layer 3 contains thermoplastic resin serving as the binder. The thermoplastic resin may be chlorinated polyolefin, acid modified chlorinated polyolefin, acrylic modification chlorinated polyolefin, thermoplastic polyurethane, polyester and acrylic, for example. Among these, preferred is chlorinated polyolefin-based thermoplastic resin because it has a high adhesiveness to target object 10 formed by a poor adhesive material of low softening point such as polypropylene. More preferred is the acid modified chlorinated polyolefin. Ground layer 3 is polarized by the acid modified chlorinated polyolefin containing a polar chlorine and a maleic anhydride group. Materials other than the thermoplastic resin may be available if they serve as the binder of ground layer 3. However, the parts of hydrophobic fine particles 9 are buried in ground layer 3 because the thermoplastic resin is softened when second coating agent 6 is heated and dried to form upper layer 5 described later. Thus, the thermoplastic resin is still preferred as the binder material.

Ground layer 3 may be a single layer or a lamination of two or more layers.

Ground layer 3 may have any thickness if hydrophobic fine particles 9 contained in upper layer 5 can be buried in ground layer 3. If the thickness of ground layer 3 is smaller than a depth of each of the parts of hydrophobic fine particles 9, each of the parts of hydrophobic fine particles 9 is hardly fixed on ground layer 3 with each of the parts of hydrophobic fine particles 9 buried in ground layer 3. As such, the thickness of ground layer 3 is preferably 0.5 μm to 50 μm, more preferably 1 μm to 10 μm, most preferably around 5 μm. The depth of each of the parts of hydrophobic fine particles 9 is a shortest length measured from a bottom end of each of the parts of hydrophobic fine particles 9 buried in ground layer 3 to the top surface of ground layer 3.

Upper layer 5 is formed by applying second coating agent 6 onto the surface of ground layer 3 and drying second coating agent 6 (Refer to FIG. 3). Upper layer 5 contains hydrophobic fine particles 9. Each of the parts of hydrophobic fine particles 9 is fixed on ground layer 3 with each of the parts of hydrophobic fine particles 9 buried in ground layer 3 and each of the remaining parts of hydrophobic fine particles 9 exposed. Hydrophobic fine particles 9 contained in upper layer 5 are fixed on the surface of target object 10 across ground layer 3, resulting in target object 10 having the repellency and the rub fastness.

Upper layer 5 is preferably formed so that a percentage of an exposed area of ground layer 3 in an entire area of ground layer 3 is smaller than 10% or less when viewed from above upper layer 5. The percentage of the exposed area of ground layer 3 is not a percentage of ground layer 3 not in contact with hydrophobic fine particles 9, but a percentage of ground layer 3 observable from between hydrophobic fine particles 9 contained in upper layer 5 when coating film 1 is viewed vertically from above upper layer 5. If the percentage of the exposed area of ground layer 3 is 10% and over, the repellency required for coating film 1 may not be achieved. As such, upper layer 5 is formed in the embodiment so that the percentage of the exposed area of ground layer 3 in the entire area of ground layer 3 is 10% or less.

Hydrophobic fine particles 9 are repellent. Target object 10 can be repellent by applying second coating agent 6 containing hydrophobic fine particles 9 onto target object 10. Coating film 1 has the repellency with the parts of hydrophobic fine particles 9 buried in ground layer 3.

Hydrophobic fine particles 9 may be any type if they have the repellency. For example, they may be hydrophobic silica particles, silicone resin particles and fluorocarbon resin particles. Among these, the hydrophobic silica particles and the silicone resin particles, both having the repellency, are preferable to the fluorocarbon resin particles. This is because the fluorocarbon resin particles hardly disperse in coating agent 2 without surfactant as dispersant. Adding the surfactant may reduce the repellency of coating film 1 due to amphiphilicity of the surfactant. As such, the hydrophobic silica particles and the silicone resin particles are still preferable to the fluorocarbon resin particles.

Among the types of hydrophobic fine particles 9 illustrated above, second coating agent 6 may optionally contain a single type or simultaneously contain plural types. For example, only either one of the hydrophobic silica particles and the silicone resin particles, or a mixture of them is available. A second embodiment details coating film 1 containing the plural types of hydrophobic fine particles 9.

A mean particle size of each of the hydrophobic silica particles each having a true specific gravity of 2 g/cm$^3$ and over is between 5 nm and 50 nm, preferably 7 nm. The mean particle size of 50 nm and over causes a high sedimentation rate of hydrophobic fine particles 9 into melted ground layer 3. Then hydrophobic fine particles 9 are fully buried in ground layer 3 and a desired repellency may not be achieved. A small mean particle size of less than 5 nm may cause inconvenience in preparative isolation. The true specific gravity of each of the hydrophobic silica particles is calculated by dividing a true density of each of the hydrophobic silica particles (a density calculated by only a volume occupied by each of the hydrophobic silica particles themselves) by water density. The mean particle size described in the claims and embodiments is a measured value of a primary particle diameter in a non-aggregated state, for example, a particle diameter at an integrated value of 50% in a particle size distribution obtained by the laser diffractometry.

The mean particle size of each of the silicone resin particles each having a true specific gravity of 1.4 g/cm$^3$ or less is between 0.5 μm and 20 μm, preferably 2 μm. The mean particle size of greater than 20 μm causes the high sedimentation rate of hydrophobic fine particles 9 into melted ground layer 3. Then hydrophobic fine particles 9 are fully buried in ground layer 3 and the desired repellency may not be achieved. The mean particle size of less than 0.5 μm causes a low sedimentation rate of hydrophobic fine particles 9 into melted ground layer 3. Then, a surface area of each of parts of the silicon resin particles in contact with ground layer 3 is reduced and the parts of the silicon resin particles are insufficiently buried in ground layer 3. Thus, the rub fastness may be reduced. The true specific gravity of each of the silicon resin particles is calculated by dividing a true density of each of the silicon resin particles (a density calculated by only a volume occupied by each of the silicon resin particles themselves) by water density.

Hydrophobic fine particles 9 are preferably smooth spherical shapes. This is because water is less likely to accumulate on surfaces of hydrophobic fine particles 9 of smooth spherical shape than those of tabular or concave coating films or those of tabular or concave particles and of uneven spherical particles, resulting in coating film 1 of high repellency.

Hydrophobic fine particles 9 each have an end buried in ground layer 3, the end is referred to as the part herein. Each of the surface areas of the parts of hydrophobic fine particles 9 is preferably 50% or less of an entire surface area of each of hydrophobic fine particles 9, more preferably 20% to 40%. As each of the surface areas of the parts exceeds 50% of the entire surface area of each of hydrophobic fine particles 9, the percentage of the exposed area of ground layer 3 in the entire area of ground layer 3 increases, thus the repellency is reduced. Thus, to form coating film 1 of the desired repellency, each of the surface areas of the parts of hydrophobic fine particles 9 is still preferably 50% or less of each of the entire surface areas of hydrophobic fine particles 9. For example, if the parts of hydrophobic fine particles 9 are not buried in ground layer 3 at all, the surfaces of the parts of hydrophobic fine particles 9 only contact with the surface of ground layer 3. As such, the desired rub fastness is not achieved, resulting in coating film 1 of less repellency and less rub fastness. The parts should be entirely buried in ground layer 3. The surface areas of the parts of hydrophobic fine particles 9 are only those of the ends buried in ground layer 3.

Forming Process

With reference to FIG. 2, a forming process of coating film 1 will now be described. FIG. 2 is a schematic cross-sectional view of the forming process of coating film 1 according to a first embodiment of the present invention. FIG. 2(A) is a schematic cross-sectional view immediately after first coating agent 4 is applied onto a surface of a target object. FIG. 2(B) is another schematic cross-sectional view of ground layer 3 formed by drying first coating agent 4. FIG. 2(C.) is yet another schematic cross-sectional view immediately after second coating agent 6 is applied onto a surface of ground layer 3. FIG. 2(D) is yet another schematic cross-sectional view of coating film 1 formed by drying second coating agent 6. The forming process of coating film 1 includes some steps for forming ground layer 3 first and then forming upper layer 5. Ground layer 3 is formed by a first step described in the claims, and upper layer 5 is formed by second and third steps described in the claims.

Material

With reference to FIG. 3, coating agent 2 will now be described.

FIG. 3 is a composition diagram of coating agent 2 according to a first embodiment and a second embodiment of the present invention.

Coating agent 2 is a collective term of first coating agent 4 and second coating agent 6. Coating agent 2 is applied onto target object 10. Target object 10, on which coating agent 2 is applied, is not limited to a fan. Coating agent 2 is applicable to objects other than exemplary target object 10 described before.

First coating agent 4 is a chemical forming a binder to fix hydrophobic fine particles 9 contained in second coating agent 6. Ground layer 3 is formed by drying first coating agent 4. As indicated in FIG. 3, first coating agent 4 is the chemical containing a binder resin solution and a solvent.

A binder component contained in the binder resin solution for first coating agent 4 is thermoplastic resin. Ground layer 3 is formed by applying first coating agent 4, which contains the thermoplastic resin, onto a surface of target object 10 and drying first coating agent 4. Second coating agent 6 is then applied onto a surface of ground layer 3 and second coating agent 6 is heated and dried at a temperature higher than a softening point of the thermoplastic resin. Resultantly, the thermoplastic resin contained in the binder resin solution is softened and parts of hydrophobic fine particles 9 contained in upper layer 5 are buried in ground layer 3. Thus, rub fastness of coating film 1 is increased. Ground layer 3 formed by first coating agent 4 is adhesive and adheres to the surface of target object 10. The surface of target object 10 is accordingly adhesive by ground layer 3 containing first coating agent 4. The softening point is a temperature that a solid material without a clear melting point starts to soften and deform when heated. The binder component serves as adhesive between objects.

The thermoplastic resin contained in the binder resin solution for first coating agent 4 may be chlorinated polyolefin (softening point of 60 C), acid modified chlorinated polyolefin (softening point of 55 C), acrylic modification chlorinated polyolefin (softening point of 80 C), acrylic (softening point of 100 C) or polyester (softening point of 255 C), for example. Among these, chlorinated polyolefin-based thermoplastic resin is preferable because it has a high adhesiveness to target object 10 made of poor adhesive material of low softening point such as polypropylene. More preferred is the acid modified chlorinated polyolefin. Ground layer 3 is polarized by the acid modified chlorinated polyolefin containing a polar chlorine and a maleic anhydride group. An advantage of having a polarity will now be described. Each of polar groups including a choro group and the maleic anhydride group contained in the acid modified chlorinated polyolefin binds to a hydroxyl group of alcohol such as ethanol, which is a solvent for second coating agent 6 described later. An alkyl group of alcohol such as ethanol binds to another alkyl group contained in hydrophobic silica particles corresponding to hydrophobic fine particles 9. Thus, hydrophobic fine particles 9 such as the hydrophobic silica particles bind to ground layer 3 via the alcohol and are arranged on ground layer 3. When alcohol volatilizes, the parts of hydrophobic fine particles 9 contact with ground layer 3 and then are buried in ground layer 3. Thus, ground layer 3 and hydrophobic fine particles 9 indirectly bind each other by the binder component having the polar group, then the rub fastness of coating film 1 is increased.

A ratio of the binder resin solution contained in first coating agent 4 is not specified if the binder component works enough to fix hydrophobic fine particles 9. For example, a combination ratio between the binder resin solution and a diluent solvent may be 3 to 7 or 5 to 5.

The diluent solvent for first coating agent 4 may be toluene, which dilutes and disperses the binder resin solution for ground layer 3.

Additives having hydrophilicity, such as emulsifying agent, must not be added to first coating agent 4. This is because ground layer 3 having hydrophilicity may reduce the repellency of coating film 1. Additionally, in a third step of forming upper layer 5 of applying and drying second coating agent 6 described later, a hydrophilic component contained in ground layer 3 oozes into upper layer 5, resulting in a significant reduction in the repellency of coating film 1.

As indicated in FIG. 3, second coating agent 6 is another chemical containing hydrophobic fine particles 9 and a solvent. Second coating agent 6 is applied onto ground layer 3 and gives the repellency to target object 10. Second coating agent 6 is dried to form upper layer 5 on ground layer 3, resulting in coating film 1.

A percentage of hydrophobic fine particles 9 contained in second coating agent 6 is not particularly specified, however, preferably 0.5% to 5%, more preferably around 1%. The percentage of greater than 5% causes an increase in viscosity of second coating agent 6, resultantly it is hard to apply second coating agent 6 onto target object 10 or control an application quantity of second coating agent 6.

Solvents for second coating agent 6 may be ethanol, methanol or toluene. More particularly, types of the solvents vary according to a specific gravity and a particle size of each of hydrophobic fine particles 9. Specifically, ethanol or methanol is suitable for the hydrophobic silica particles and ethanol, methanol or and toluene is suitable for the silicone resin particles. The reason to change the types of the solvent is to prevent hydrophobic fine particles 9, for example, the hydrophobic silica particles of small particle size and large specific gravity, from being fully buried in ground layer 3.

No additives having hydrophilicity, such as the surfactant, are preferably added to second coating agent 6. No surfactant is added in the embodiment because adding the surfactant causes an exposure of the surfactant on the surface of coating film 1 and a hydrophilic group contained in the surfactant reduces the repellency of hydrophobic fine particles 9.

Forming Process

With reference to FIGS. 2(A) and (B), a step of forming ground layer 3 will now be described. The step forms ground layer 3 on at least a surface of target object 10 requiring repellency. Ground layer 3 serving as a binder prevents upper layer 5 from being separated from the surface of target object 10. A step of forming upper layer 5 will be described later.

As indicated in FIG. 2(A) of, first coating agent 4 is applied onto the surface of target object 10. A solvent for first coating agent 4 may be toluene. First coating agent 4 may be applied onto the surface of target object 10 with a spray gun. Or target object 10 may be immersed in first coating agent 4 and then an extra liquid may be removed from target object 10. Sufficient first coating agent 4 is applied to cover the surface of target object 10 so that the surface of target object 10 is not exposed.

Then, air drying or heat drying volatilizes the solvent. Resultantly, ground layer 3 is formed on the surface of target object 10 as indicated in FIG. 2(B). A temperature of the heat drying is not specified if a component of ground layer 3 is not affected (100 C, for example). The heat drying shortens a time required for forming ground layer 3. Resulting ground layer 3 serves as the binder to solidify upper layer 5 on ground layer 3.

The step of forming ground layer 3 is as described above.

The step of forming ground layer 3 is followed by a step of forming upper layer 5.

With reference to FIGS. 2(C.) and (D), the step of forming upper layer 5 will now be described. The step forms upper layer 5 having repellency on a surface of ground layer 3. In the step, parts of hydrophobic fine particles 9 are buried in ground layer 3. As such, coating film 1 has the repellency hardly reduced and a high rub fastness.

After ground layer 3 is formed, as indicated in FIG. 2(C.), second coating agent 6 is applied onto the surface of ground layer 3, which corresponds to a second step described in the claims. A solvent for second coating agent 6 may be ethanol, water or toluene suitable for hydrophobic fine particles 9. Sufficient second coating agent 6 is applied to cover the surface of ground layer 3 so that the surface of ground layer 3 is not exposed. Preferably, second coating agent 6 is applied so that a percentage of an exposed area of ground layer 3 in an entire area of ground layer 3 is 10% or less when viewed from above upper layer 5 after upper layer 5 is formed. The percentage of the exposed area of 10% and over does not meet a required repellency. The air drying or the heat drying volatilizes second coating agent 6 after it is applied, which corresponds to a third step described in the claims Thus, upper layer 5 is formed as indicated in FIG. 2(D).

The air drying and the heat drying to form upper layer 5 are will now be described respectively.

The air drying volatilizes the solvent contained in second coating agent 6, then hydrophobic fine particles 9 are arranged on the surface of ground layer 3. Ground layer 3 and hydrophobic fine particles 9 indirectly bind together, then the parts of hydrophobic fine particles 9 are buried in ground layer 3, resulting in coating film 1 having the repellency and the fab fastness.

The heat drying volatilizes the solvent contained in second coating agent 6, then hydrophobic fine particles 9 are arranged on the surface of ground layer 3. The parts of hydrophobic fine particles 9 are readily buried in ground layer 3 because the thermoplastic resin serving as the binder contained in ground layer 3 is softened by heating. Thus, the rub fastness is increased. A temperature of the heat drying is not specified if a component of upper layer 5 and the component of ground layer 3 previously formed are not affected (100 C, for example). However, because ground layer 3 contains the thermoplastic resin, a high temperature (260 C and over, for example) excessively softens the thermoplastic resin. As such, hydrophobic fine particles 9 contained in upper layer 5 are fully buried in ground layer 3, then the desired repellency may not be achieved. Thus, upper layer 5 is preferably heated at a temperature close to a softening point of the thermoplastic resin (100 C, for example). As indicated in FIG. 2(D), the parts of hydrophobic fine particles 9 are buried in ground layer 3 and surfaces of remaining parts of hydrophobic fine particles 9 are exposed, resulting in coating film 1 having the repellency and the fab fastness.

The forming process described above forms coating film 1 on the surface of target object 10. First coating agent 4 is applied onto the surface of target object 10 and then dried to form ground layer 3. Subsequently, second coating agent 6 is applied onto the surface of ground layer 3 and then dried to form upper layer 5. As such, coating film 1 controls reduction in the repellency of hydrophobic fine particles 9 and has a high rub fastness.

With reference to examples and comparative examples, characteristics of respective coating films experimentally formed on the surface of target object 10 will now be described.

With reference to FIG. 4 through FIG. 9, the examples and the comparative examples will now be described. FIG. 4 illustrates a summary of detailed conditions and evaluation results of each of coating films according to a first example through a sixth example. FIG. 5 illustrates a summary of detailed conditions and evaluation results of each of coating films according to a first comparative example through a fifth comparative examples. FIG. 6 is a schematic cross-sectional view of a coating film according to the first comparative example. FIG. 7 is a schematic cross-sectional view of a coating film according to the second comparative example and the third comparative example. FIG. 8 is a schematic cross-sectional view of a coating film according to the fourth comparative example. FIG. 9 is a schematic cross-sectional view of a coating film according to the fifth comparative example.

Along with the examples and the comparative examples described above, detailed experimental results and characteristics of the coating films will now be described. The examples hereinafter should not be construed to limit the scope of the present invention.

As indicated in the examples of FIG. 4 and in the comparative examples of FIG. 5, coating agent 2 differs in composition. Coating film 1 is evaluated by applying coating agent 2 onto target object 10 and drying it (the comparative examples include coating film 101, coating film 201, coating film 401 and coating film 501).

Target object 10 is a polypropylene resin plate of 50 mm square with 0.5 mm thickness for all the examples and the comparative examples.

Each of evaluation results is according to measurements and the evaluation criteria below.

Rub Fastness

Rub fastness is determined according to evaluation criteria below.

A surface of target object 10, where coating film 1 or a structure containing hydrophobic fine particles 9 corresponding to coating film 1 is formed, is traced by a fingertip to observe a quantity of powder adhering to the fingertip. The rub fastness is evaluated according to the quantity of powder adhering to the fingertip as below, the quantity of powder is huge: "failure", moderate: "low", small: "medium", and little: "high". Coating film 1 determined to be "low", "medium" or "high" may be available for target object 10 that users rarely touch (a fan impeller, for example).

Repellency

Repellency is determined according to evaluation criteria below.

A surface of target object 10, where coating film 1 or a structure containing hydrophobic fine particles 9 corresponding to coating film 1 is formed, is watered with an atomizer. Then, the resulting surface is observed to evaluate the repellency. If water drops continue to adhere to the surface of target object 10 and water is not repelled, the evaluation is "failure". If the surface of target object 10 repels water and water is blown off by strongly breathing on the surface, the result is "low". If the surface of target object 10 repels water and water is blown off by gently breathing on the surface, the result is "medium". If the surface of target object 10 is watered with the atomizer, then water is blown off by wind pressure of the atomizer and little adhesion of water drops is observed on the surface, the result is "high". Coating film 1 determined to be "medium" or "high" is preferable.

Measurement of Contact Angle

A contact angle is measured with an auto contact angle meter of DM-701 manufactured by Kyowa Interface Science Co., Ltd. The contact angle is measured by dropping a water drop of around 2 μL on coating film 1 or a surface of a substance corresponding to coating film 1, then the contact angle is measured.

Repellency after Rubbing Test

Repellency after rubbing test is evaluated according to the same evaluation criteria as those for the repellency above described. The rubbing test is provided on a surface of target object 10 where coating film 1 is formed or on a surface of target object 110 where a structure containing hydrophobic fine particles 9 corresponding to coating film 1 is formed. Kimwipe is pressed on the surface at a load of 30 g/cm$^2$ and then rubbed back and forth against the surface. Then, the repellency is evaluated by spraying water on the surface.

Forming conditions of coating films in examples and comparative examples will now be described.

First Example

Solvent-based acid modified chlorinated polyolefin solution 930 (manufactured by NIPPON PAPER INDUSTRIES CO., LTD., a solid content of 20%, a mixed solvent of toluene and cyclohexane of 80%, a percentage in first coating agent 4 of 30%) is diluted and dissolved with toluene (a percentage in first coating agent 4 of 70%) to prepare first coating agent 4. First coating agent 4 is applied onto target object 10 with a spray gun and then dried by air at 25 C to volatilize the mixed solvent and form ground layer 3 (a film thickness of 5 μm). Then, hydrophobic silica particles RX50 (manufactured by NIPPON AEROSIL CO., LTD., a mean particle size of 40 nm, a true specific gravity of 2.2 g/cm$^3$, a percentage in second coating agent 6 of 1%) is dispersed in a solvent of ethanol (a percentage in second coating agent 6 of 99%) to prepare second coating agent 6. Resulting second coating agent 6 is applied onto ground layer 3 with the spray gun to form coating film 1. Second coating agent 6 is dried by air at 25 C for 5 minutes and is heated and dried at 100 C for 5 minutes to prepare two types of samples. The solvent is completely volatilized in both samples. FIG. 4 is the evaluation results.

Second Example

Coating film 1 in a second example is formed on the same forming conditions as those of the first example except that hydrophobic silica particles RX300 (manufactured by NIPPON AEROSIL CO., LTD., a mean particle size of 7 nm, a true specific gravity of 2.2 g/cm$^3$, a percentage in second coating agent 6 of 1%) are contained in second coating agent 6. FIG. 4 is the evaluation results.

Third Example

Coating film 1 in a third example is formed on the same forming conditions as those of the second example except that a mixed solvent of ethanol (40%) and water (59%) is contained in second coating agent 6. FIG. 4 is the evaluation results.

First Comparative Example

Hydrophobic silica particles RX300 (manufactured by NIPPON AEROSIL CO., LTD., a mean particle size of 7 nm, a true specific gravity of 2.2 g/cm$^3$, a percentage in second coating agent 6 of 1%) are dispersed in a mixed solvent of ethanol (40%) and water (59%) to prepare second coating agent 6. Resulting second coating agent 6 is applied directly onto a surface of target object 110 with a spray gun to form coating film 101. FIG. 6 illustrates a schematic cross-sectional view of coating film 101 according to a first comparative example. Second coating agent 6 is dried by air at 25 C for 5 minutes and is heated and dried at 100 C for 5 minutes to prepare two types of samples. Ground layer 3 is formed in the first example, however, only upper layer 5 is formed on target object 110 in the first comparative example. FIG. 5 is the evaluation results.

Second Comparative Example

As with the first comparative example, ground layer 3 is not formed on target object 110, however, a composition of second coating agent 6 is changed. Hydrophobic silica particles RX300 (manufactured by NIPPON AEROSIL CO., LTD., a mean particle size of 7 nm, a percentage in second coating agent 6 of 1%) and fluorocarbon resin solution LF 800 (manufactured by AGC Inc., a solid content of 60%, a mixed solvent primarily containing mineral spirit and xylene of 40%, a percentage in second coating agent 6 of 20%) are dispersed and dissolved in a solvent of ethanol (79%) to prepare second coating agent 6. Resulting second coating agent 6 is applied directly onto a surface of target object 110 with a spray gun to form coating film 201. FIG. 7 illustrates a schematic cross-sectional view of coating film 201 according to the second comparative example and the third comparative example. Thus, coating film 201 containing the fluorocarbon resin as a binder component is formed. Second coating agent 6 is dried by air at 25 C for 5 minutes and is heated and dried at 100 C for 5 minutes to prepare two types of samples. FIG. 5 is the evaluation results.

Third Comparative Example

As with the first comparative example and the second comparative example, ground layer 3 is not formed on target object 110, however, a composition of second coating agent 6 is changed. Hydrophobic silica particles RX300 (manufactured by NIPPON AEROSIL CO., LTD., a mean particle size of 7 nm, a percentage in second coating agent 6 of 1%) and chlorinated polyolefin aqueous emulsion E-480T (manufactured by NIPPON PAPER INDUSTRIES CO., LTD., a solid content of 30%, a percentage in second coating agent 6 of 10%) are dispersed and dissolved in a mixed solvent of ethanol (40%) and water (49%) to prepare second coating agent 6. Resulting second coating agent 6 is applied directly onto a surface of target object 110 with a spray gun to form coating film 201. FIG. 7 is a schematic cross-sectional view of coating film 201 according to the second comparative example and the third comparative example. Coating film 201 containing the chlorinated polyolefin aqueous emulsion as a binder component is formed. Second coating agent 6 is dried by air at 25 C for 5 minutes and is heated and dried at 100 C for 5 minutes to prepare two types of samples. FIG. 5 is the evaluation results.

Fourth Comparative Example

As first coating agent 4, chlorinated polyolefin aqueous emulsion E-480T (manufactured by NIPPON PAPER INDUSTRIES CO., LTD., a solid content of 30%, a percentage in first coating agent 4 of 100%) is applied directly onto a surface of target object 110 with a spray gun and is dried by air at 25 C to form ground layer 3. Then, second coating agent 6 same as that applied in the third example is applied directly onto a surface of ground layer 3 with a spray gun to form coating film 401. FIG. 8 is a schematic cross-sectional view of coating film 401 according to the fourth comparative example. Second coating agent 6 is dried by air at 25 C for 5 minutes and is heated and dried at 100 C for 5 minutes to prepare two types of samples. FIG. 5 is the evaluation results.

Fifth Comparative Example

A step of forming ground layer 103 is the same as those of the first example through the third example. A step of forming upper layer 5 is the same as those of the second example and the third example except that a solvent is toluene (99%) to form upper layer 5, thus coating film 501 is formed. FIG. 9 is a schematic cross-sectional view of coating film 501 according to the fifth comparative example. FIG. 5 is the evaluation results.

The evaluation results of the respective coating films according to the examples and the comparative examples will now be described.

Evaluation on Comparative Examples

As indicated in FIG. 4, coating film 1 according to the first example through the third example meets the evaluation criteria both in rub fastness and repellency. In contrast, as indicated in FIG. 5, coating film 101, coating film 201, coating film 401 and coating film 501 according to the first comparative examples through the fifth comparative example, which are formed at 25 C and 100 C, fail to meet the evaluation criteria both in the rub fastness and the repellency. Detailed reasons of the evaluation results will now be described.

In the first comparative example, only second coating agent 6, which contains hydrophobic silica particles and a mixed solvent, is applied onto a surface of target object 110. As indicated in FIG. 6, coating film 101 is formed on the surface of target object 110 with entire hydrophobic fine particles 109 exposed. Coating film 101 has a contact angle of 167 degrees, then the repellency of coating film 101 is "high". However, no binder component corresponding to ground layer 3 is contained in coating film 101 and the hydrophobic silica particles are not fixed on the surface of target object 110, resulting in the rub fastness of "failure". The repellency after rubbing test is "failure" because the hydrophobic silica particles are separated from target object 110. From the evaluation result described above, coating film 1 having the repellency and the rub fastness needs to contain the binder component.

Then, as the binder component for coating film 201 in the second comparative example and in the third comparative example, second coating agent 6 contains fluorocarbon resin solution and chlorinated polyolefin aqueous emulsion respectively. As indicated in FIG. 7, coating film 201 is formed on the surface of target object 110 with hydrophobic fine particles 109 wrapped with covering film 203. In the second comparative example, the rub fastness is "medium" and the repellency is "low" at contact angles of 132 degrees (air drying) and 128 degrees (heat drying). In the third comparative example, the rub fastness is "failure" both for air drying and heat drying, and the repellency is "low" at the contact angle of 164 degrees. This is probably because surfaces of hydrophobic fine particles 109 are wrapped with covering film 203 containing the binder component by applying a mixture of hydrophobic fine particles 109 and the binder component onto the surface of target object 110. Additionally, the chlorinated polyolefin aqueous emulsion, which is the binder component in the third comparative example, contains amphiphilic surfactant. The amphiphilic surfactant contained in coating film 201 practically reduces the repellency. The repellency after the rubbing test results in "failure" both in the second comparative example and the third comparative example because coating film 201 is rubbed and then separated from the surface of target object 110. As a percentage of the chlorinated polyolefin aqueous emulsion is increased to improve the rub fastness, the repellency further reduces.

In the fourth comparative example, ground layer 103 is formed by the chlorinated polyolefin aqueous emulsion. As indicated in FIG. 8, coating film 401 is formed with hydrophobic fine particles 109 wrapped with covering film 403, which is formed by the surfactant, which oozes from the chlorinated polyolefin aqueous emulsion contained in ground layer 103. In the fourth comparative example, the rub fastness is "failure" for air drying and "high" for heat drying. This is because the chlorinated polyolefin resin contained in ground layer 103 is dissolved by heating and then parts of hydrophobic fine particles 109 contained in second coating agent 6 are buried and fixed on ground layer 103. However, the repellency is "failure" both for air drying and heat drying. The contact angles are low, 10 degrees for air drying and 11 degrees for heat drying respectively. As described above, this is because covering film 403 formed by the surfactant, which oozes from the chlorinated polyolefin aqueous emulsion contained in ground layer 103, interacts with water, resulting in a significant reduction in the repellency of coating film 401.

In the fifth comparative example, second coating agent 6, which contains hydrophobic silica particles 109 dispersed in a solvent of toluene, is applied onto a surface of ground layer 103 to form an upper layer. Coating film 501 is formed on target object 110 with hydrophobic fine particles 109 fully buried in ground layer 103. The contact angle is 132 degrees both for air drying and heat drying. The rub fastness is "medium" for air drying and "high" for heat drying. However, the repellency is "low" both for air drying and heat drying. As such, coating film 501 fails to meet the criteria of the rub fastness and the repellency simultaneously. This may be caused by an effect of toluene contained in second coating agent 2. A solvent of aromatic hydrocarbons such as toluene, which has a high affinity for the chlorinated polyolefin, leads to dissolution of the surface of ground layer 103. Thus, as the surface of ground layer 103 dissolves, the hydrophobic silica particles as hydrophobic fine particles 109 sink into ground layer 103 containing acid modified chlorinated polyolefin dissolved in toluene. Then, the solvent of toluene contained in second coating agent 6 dilutes, and the hydrophobic silica particles may be fully buried in ground layer 103. As such, the hydrophobic silica particles are not exposed on the surface of ground layer 103, resulting in coating film 501 of low repellency.

Evaluation on Examples

In the first example, acid modified chlorinated polyolefin dissolved in a solvent of toluene is applied onto a surface of target object 10 and then dried to form ground layer 3, and hydrophobic silica particles dissolved in a solvent of ethanol are applied onto a surface of ground layer 3 to form upper layer 5, resulting in forming coating film 1. A contact angle for air drying is 127 degrees and the contact angel for heat drying is 107 degrees. Rub fastness and repellency are "medium" both for air drying and heat drying. This is because, a hydroxyl group contained in ethanol, which is the solvent for second coating agent 6, binds to polar groups such as a chloro group and a maleic anhydride group contained in the acid modification chlorinated polyolefin serving as a binder component for ground layer 3. An alkyl group of alcohol such as ethanol binds to another alkyl group contained in the hydrophobic silica particles. Thus, the hydrophobic silica particles bind to ground layer 3 via alcohol and are orderly arranged on the surface of ground layer 3. When alcohol dilutes, parts of the hydrophobic silica particles contact with ground layer 3 and are then buried in ground layer 3. The rub fastness is increased because the parts of the hydrophobic silica particles are fixed on ground layer 3. Additionally, only the parts of the hydrophobic silica particles are buried in ground layer 3, then the repellency of the hydrophobic silica particles appears and lasts. Thus, coating film 1 of the first example presumably has a high rub fastness and a high repellency simultaneously.

In the second example, the hydrophobic silica particles each have a mean particle size of 7 nm smaller than that of 40 nm of the hydrophobic silica particles applied in the first example. In the second example, the contact angle is 167 degrees both for air drying and heat drying. The rub fastness is "failure" for air drying and is "medium" for heat drying. This is presumably caused by the mean particle size of the hydrophobic silica particles. The hydrophobic silica particles applied in the second example hardly adhere to ground layer 3 by air drying due to a small mean particle size of 7 nm, resulting in coating film 1 of low rub fastness. Thus, the hydrophobic silica particles need to be heated at 100 C higher than a softening point of the acid modified chlorinated polyolefin contained in ground layer 3 to accelerate a dissolution of ground layer 3 and bury the parts of the hydrophobic silica particles into ground layer 3.

The repellency is "high" both for air drying and heat drying.

In the third example, a solvent composition of second coating agent 6 is different from that, which contains only ethanol, in the second example. Specifically, the solvent composition of the third example is a mixture of ethanol and water. As with the second example, the contact angle is 167 degrees both for air drying and heat drying, and the repellency is "high" both for air drying and heat drying. Whereas the rub fastness is "low" for air drying and is "medium" for heat drying. The rub fastness is increased for air drying compared to that of the second example. This is presumably because second coating agent 6 contains not only ethanol but also water. More specifically, an alkyl group contained in the hydrophobic silica particles binds to another alkyl group of alcohol such as ethanol. Then water binds hydroxyl groups bound to the hydrophobic silica particles Ethanol and water bind the hydrophobic silica particles with each other, and the hydrophobic silica particles each maintain a loose binding with each other even after the mixed solvent is diluted and dried. As such, the rub fastness for air drying is presumably increased.

To increase both the repellency and the rub fastness, the parts of hydrophobic fine particles 9 need to be buried in ground layer 3 and fixed by the binder component with remaining parts of hydrophobic fine particles 9 exposed.

Then, forming conditions and the evaluation results of coating film 1 will now be described. Coating film 1 below includes ground layer 3 containing a binder resin solution different from those of the first example through the third example.

Fourth Example

Solvent-based chlorinated polyolefin solution 813A (manufactured by NIPPON PAPER INDUSTRIES CO., LTD., a solid content of 55%, a percentage in first coating agent 4 of 50%) is dissolved with a solvent of toluene (a percentage in first coating agent 4 of 50%) to prepare first coating agent 4. First coating agent 4 is applied onto target object 10 with a spray gun and then dried at 25 C and the solvent is volatilized to form ground layer 3 (a film thickness of 5 μm). Then, hydrophobic silica particles RX300 (manufactured by NIPPON AEROSIL CO., LTD., a mean particle size of 7 nm, a true specific gravity of 2.2 g/cm$^3$, a percentage in second coating agent 6 of 1%) are dispersed in a mixed solvent of ethanol (a percentage in second coating agent 6 of 40%) and water (a percentage in second coating agent 6 of 59%) to prepare second coating agent 6. Resulting second coating agent 6 is applied directly onto a surface of ground layer 3 with the spray gun to form coating film 1. Second coating agent 6 is dried by air at 25 C for 5 minutes and is heated and dried at 100 C for 5 minutes to prepare two types of samples. The mixed solvent is completely volatilized in both samples. FIG. 4 is the evaluation results.

In the fourth example, the contact angle is 164 degrees for air drying and 103 degrees for heat drying. As with the third example, the repellency is "high", and the rub fastness is "low" for air drying. In contrast, the repellency is "medium" and the rub fastness is "high" for heat drying. the rub fastness is increased for heat drying compared to that of the third example. This is presumably due to a difference in a molecular weight of the chlorinated polyolefin, which is the binder component of ground layer 3. Chlorinated polyolefin solution 813A applied in the fourth example has a shorter molecular chain and a smaller molecular weight compared to those of acid modified chlorinated polyolefin solution 930 in the first example through the third example. Thus, compared to acid modified chlorinated polyolefin solution 930 applied in the first example through the third example, chlorinated polyolefin 813A readily softens when heated at a temperature higher than a softening point, results in ground layer 3 of high tackiness. The parts of the hydrophobic silica particles sufficiently sink into ground layer 3 and an exposed area of ground layer 3 is reduced, then the rub fastness of coating film 1 is presumably increased.

Then, the forming conditions and evaluation results of coating film 1 will now be described. Coating film 1 below includes upper layer 5 containing hydrophobic fine particles 9 different from those of the first example through the fourth example.

Fifth Example

Solvent-based acid modified chlorinated polyolefin solution 930 (manufactured by NIPPON PAPER INDUSTRIES CO., LTD., a solid content of 20%, a mixed solvent of toluene and cyclohexane of 80%, a percentage in first coating agent 4 of 30%) is diluted and dissolved with toluene (a percentage in first coating agent 4 of 70%) to prepare first coating agent 4. First coating agent 4 is applied onto target object 10 with a spray gun and then dried at 25 C. The mixed solvent is volatilized to form ground layer 3 (a film thickness of 5 μm). Then, silicone resin particles Tospearl 120 (manufactured by Momentive Performance Materials, a mean particle size of 2 μm, a true specific gravity of 1.32 g/cm$^3$, a percentage in second coating agent 6 of 1%) is dispersed in a solvent of toluene (a percentage in second coating agent 6 of 99%) to prepare second coating agent 6. Resulting second coating agent 6 is applied onto ground layer 3 with the spray gun to form coating film 1. Second coating agent 6 is dried by air at 25 C for 5 minutes and is heated and dried at 100 C for 5 minutes to prepare two types of samples. The solvent is completely volatilized in both samples. FIG. 4 is the evaluation results.

Sixth Example

In the sixth example, the forming conditions of coating film 1 are the same as those of the fifth example except that hydrophobic fine particles 9 are silicone resin particles Tospearl 1100 (manufactured by Momentive Performance Materials, a mean particle size of 10 μm, a percentage in second coating agent 6 of 1%). FIG. 4 is the evaluation results.

Hydrophobic fine particles 9 applied in the fifth example and the sixth example are the silicone resin particles. The silicone resin particles each have a mean particle size larger than that of the hydrophobic silica particles applied in the first example through the fourth example, specifically 2 μm in the fifth example and 10 μm in the sixth example. The silicone resin particles each have a small true specific gravity of 1.32 g/cm$^3$. Following the change of types of hydrophobic fine particles 9, a solvent of second coating agent 6 is changed from ethanol to toluene, which is aromatic hydrocarbon. Other than the above, the forming conditions of coating film 1 are the same as those of the first example through the third example.

In the fifth example, the contact angle is 96 degrees for air drying and 102 degrees for heat drying. In the sixth example, the contact angle is 116 degrees for air drying and 114 degrees for heat drying. In both examples, the rub fastness is “high” both for air drying and heat drying, and the repellency is “medium” both for air drying and heat drying. The silicone resin particles each have a high repellency because they are organopolysiloxane particles each having a mean particle size of 2 μm to 10 μm and they each have a structure covering an entire surface of a molecular chain with a hydrophobic alkyl group bound to silicon through a helical structure of a siloxane bond chain. As with the fifth and sixth examples, the solvent of second coating agent 6 is toluene in the fifth comparative example. In the fifth comparative example, the hydrophobic silica particles, each having a small mean particle size of 7 to 40 nm and a large true specific gravity of 2.2 g/cm$^3$, are fully buried in ground layer 103 dissolved with toluene, resulting in coating film 501 of low repellency. However, the silicone resin particles each have a large mean particle size of 2 μm to 10 μm, a small true specific gravity of 1.32 g/cm$^3$ and a large buoyant force. As such, only parts of the silicone resin particles are buried in ground layer 3 dissolved with the aromatic hydrocarbon and remaining parts of the silicone resin particles remain exposed. Thus, coating film 1 having the repellency and the rub fastness is formed. Additionally, the silicone resin particles each have a large volume buried in ground layer 3 because of large mean particle size and have the rub fastness higher than that of the hydrophobic silica particles of small mean particle size. Then, the repellency in the fifth and sixth examples is “medium” both before and after the rubbing test and both for air drying and heat drying.

As described above, coating film 1 according to the first embodiment has following effects (1) through (8).

(1) Coating film 1 includes ground layer 3 containing the thermoplastic resin and upper layer 5 containing hydrophobic fine particles 9 to be formed on the surface of ground layer 3. Each of the parts of hydrophobic fine particles 9 contained in upper layer 5 is buried in ground layer 3.

According to such a configuration, the parts of hydrophobic fine particles 9 are buried in ground layer 3 and then hydrophobic fine particles 9 having the repellency are fixed on ground layer 3. The remaining parts of hydrophobic fine particles 9 contained in upper layer 5 are exposed on ground layer 3, resulting in coating film 1 having the repellency. As such, coating film 1 controls reduction in the repellency of hydrophobic fine particles 9 and increases the rub fastness.

(2) Coating film 1 contains hydrophobic fine particles 9 each having a surface area of each of the parts smaller than that of each of the remaining parts. According to such a configuration, hydrophobic fine particles 9 are arranged on ground layer 3 with the parts of hydrophobic fine particles 9 buried in ground layer 3, thus, the surface of ground layer 3 is hardly exposed. As such, water is unlikely to penetrate through non-repellent ground layer 3, resulting in coating film 1 of high repellency.

(3) Coating film 1 contains at least either the hydrophobic silica particles or the silicone resin particles as hydrophobic fine particles 9. According to such a configuration, at least the hydrophobic silica particles or the silicone resin particles are exposed on the surface of target object 10, resulting in coating film 1 of high repellency.

(4) Coating film 1 is formed so that a percentage of an exposed area of ground layer 3 in an entire area of ground layer 3 is 10% or less when viewed from above upper layer 5. Such a configuration controls the reduction in the repellency of coating film 1 with the parts of hydrophobic fine particles 9 buried in ground layer 3 even if ground layer 3 is partially exposed, resulting in coating film 1 of high repellency.

(5) Coating film 1 contains the acid modified chlorinated polyolefin as the thermoplastic resin. According to such a configuration, a polar group contained in the acid modified chlorinated polyolefin and each of the hydrophobic fine particles indirectly bind with each other, resulting in coating film 1 of higher rub fastness.

(6) Hydrophobic fine particles 9 contained in coating film 1 have smooth spherical shapes. According to such a configuration, water is less likely to accumulate on surfaces of hydrophobic fine particles 9 than those of tabular or concave coating films or those of tabular or concave particles and uneven spherical particles, resulting in coating film 1 of higher repellency.

(7) A method for forming coating film 1 includes following first to third steps, (i) first step; applying the thermoplastic resin dissolved in a solvent onto the surface of target object 10 and drying the solvent to form ground layer 3 on the surface of target object 10, (ii) second step; applying hydrophobic fine particles 9 dissolved in another solvent onto the surface of ground layer 3, and (iii) third step; drying the solvent containing hydrophobic fine particles 9 applied onto the surface of ground layer 3 in the second step to form upper layer 5. According to the method, coating film 1 is formed on the surface of coated object 10 with the parts of hydrophobic fine particles 9 buried in ground layer 3. Thus, coating film 1 formed by ground layer 3 and upper layer 5 containing hydrophobic fine particles 9 controls the reduction in the repellency of hydrophobic fine particles 9 with hydrophobic fine particles 9 fixable on coating film 1.

(8) The method for forming coating film 1 heats and dries hydrophobic fine particles 9 at a temperature higher than a softening point of the thermoplastic resin in the third step. Thus, the thermoplastic resin is softened, then hydrophobic fine particles 9 are readily buried in ground layer 3, resulting in the forming method for coating film 1 having high rub fastness.

Second Embodiment

A configuration of and a method for forming coating film 1*a* according to a second embodiment of the present invention are same as those of coating film 1 according to a first embodiment except that coating film 1*a* contains two types of hydrophobic fine particles 9. Points different from those of the first embodiment will now be primarily explained and points common to those in the first embodiment are appropriately omitted here.

Coating film 1*a* according to the second embodiment of the present invention will now be described with reference to FIG. 10. FIG. 10 is a schematic cross-sectional view of a coating film according to the second embodiment of the present invention.

Upper layer 5*a* of coating film 1*a* contains two types of hydrophobic fine particles (first hydrophobic fine particles 9*a* and second hydrophobic fine particles 9*b*). First hydrophobic fine particles 9*a* and second hydrophobic fine particles 9*b* each have a high repellency, however, first hydrophobic fine particles 9*a* are superior to second hydrophobic fine particles 9*b* in terms of repellency. Second hydrophobic fine particles 9*b* each have a mean particle size larger than that of first hydrophobic fine particles 9*a*. Second hydrophobic fine particles 9*b* each have a specific gravity smaller than that of first hydrophobic fine particles 9*a*. Two types of hydrophobic fine particles 9 of different mean particle sizes are more likely to control separation of hydrophobic fine particles 9 from ground layer 3 than only one type of hydrophobic fine particles 9 of small mean particle size. Specifically, each of parts of second hydrophobic fine particles 9*b* of large mean particle size has a contact area with ground layer 3 larger than that of each of the parts of first hydrophobic fine particles 9*a* of small mean particle size. Each of first hydrophobic fine particles 9*a* of small mean particle size is inserted between second hydrophobic fine particles 9*b* of large mean particle size, then a percentage of an exposed area of ground layer 3 in an entire area of ground layer 3 is reduced. Thus, rub fastness is increased because two types of hydrophobic fine particles 9 are more likely to control the separation of hydrophobic fine particles 9 from ground layer 3 than only one type of hydrophobic fine particles 9.

First hydrophobic fine particles 9*a* may be hydrophobic silica particles for example. A mean particle size of each of the hydrophobic silica particles of true specific gravity of 2 $g/cm^3$ and over may be between 5 nm and 50 nm, preferably 7 nm. The mean particle size of 50 nm and over causes a high sedimentation rate of hydrophobic fine particles 9 into dissolved ground layer 3 and hydrophobic fine particles 9 are fully buried in ground layer 3, accordingly, a desired repellency may not be achieved. The mean particle size of 5 nm or less may reduce workability in preparative isolation, for example.

Second hydrophobic fine particles 9*b* may be silicone resin particles for example. A mean particle size of the silicone resin particles of true specific gravity of 1.4 $g/cm^3$ or less may be between 0.5 μm and 20 μm, preferably 2 μm. The mean particle size of greater than 20 μm causes a high sedimentation rate of hydrophobic fine particles 9 into dissolved ground layer 3 and hydrophobic fine particles 9 are fully buried in ground layer 3, accordingly, the desired repellency may not be achieved. The mean particle size of less than 0.5 μm causes a low sedimentation rate, then each of the parts of hydrophobic fine particles 9 has a reduced contact area with ground layer 3, accordingly, the rub fastness may be reduced.

In FIG. 10, first hydrophobic fine particles 9*a* and second hydrophobic fine particles 9*b* contained in coating film 1*a* are alternately arranged with each other. FIG. 10 is only an example and should not be construed as limiting. For example, first hydrophobic fine particles 9*a* of small mean particle size may be randomly arranged between second hydrophobic fine particles 9*b* of large mean particle size.

Forming Method

Second coating agent 6*a* is a chemical containing first hydrophobic fine particles 9*a*, second hydrophobic fine particles 9*b* and a solvent. Second coating agent 6*a* is applied onto a surface of ground layer 3 to give repellency to target object 10. Second coating agent 6*a* is dried to form upper layer 5*a* on ground layer 3 and then coating film 1*a* is formed.

A total percentage of first hydrophobic fine particles 9*a* and second hydrophobic fine particles 9*b* contained in second coating agent 6*a* is not particularly specified, to form coating film 1*a* having the repellency, preferably 0.5% to 8%, more preferably around 2%. The total percentage of these hydrophobic fine particles of 5% and over causes an increase in viscosity of second coating agent 6*a* and causes difficulty in applying second coating agent 6*a* onto target object 10 and controlling an application quantity of second coating agent 6*a*. Whereas a performance of coating film 1*a* may be modified by changing a ratio between first hydrophobic fine particles 9*a* and second hydrophobic fine particles 9*b* while maintaining the total percentage of these hydrophobic fine particles contained in second coating agent 6*a* at a certain level. Specifically, increasing a ratio of first hydrophobic fine particles 9*a*, each having the high repellency, improves the repellency of coating film 1*a*. Or increasing a ratio of second hydrophobic fine particles 9*b*, each having a large mean particle size, improves the rub fastness of coating film 1*a*.

Example

An example will now be described with reference to FIG. 11. FIG. 11 illustrates a summary of detailed conditions and evaluation results of a coating film according to a seventh example.

The seventh example will now be described below. Detailed experimental results and properties of coating film 1*a* will now be described according to the seventh example. The example hereinafter should not be construed to limit the scope of the present invention.

As indicated in FIG. 11, to evaluate coating film 1*a*, coating agent 2 is applied onto target object 10 and dried to form coating film 1*a*.

Target object 10 is a polypropylene resin plate of 50 mm square with 0.5 mm thickness in the seventh example.

The evaluation result is according to the measurements and the evaluation criteria set forth in the examples of the first embodiment.

Seventh Example

Solvent-based acid modified chlorinated polyolefin solution 930 (manufactured by NIPPON PAPER INDUSTRIES CO., LTD., a solid content of 20%, a mixed solvent of toluene and cyclohexane of 80%, a percentage in first coating agent 4 of 30%) is diluted and dissolved with a solvent of toluene (a percentage in first coating agent 4 of 70%) to prepare first coating agent 4. First coating agent 4 is applied onto target object 10 with a spray gun and then the solvent is dried and volatilized at 25 C to form ground layer 3 (a film thickness of 5 μm). Then, two types of hydrophobic fine particles 9, which are hydrophobic silica particles RX300 (manufactured by NIPPON AEROSIL CO., LTD., a mean particle size of 7 nm, a true specific gravity of 2.2 g/cm$^3$, a percentage in second coating agent 6*a* of 1%) and silicone resin particles Tospearl 1100 (manufactured by Momentive Performance Materials, a mean particle size of 10 μm, a true specific gravity of 1.32 g/cm$^3$, a percentage in second coating agent 6*a* of 1%), are dispersed in a mixed solvent of ethanol (a percentage in second coating agent 6*a* of 40%) and water (a percentage in second coating agent 6*a* of 58%) to prepare second coating agent 6. Resulting second coating agent 6*a* is applied onto ground layer 3 with the spray gun to form coating film 1*a*. Second coating agent 6*a* is dried by air at 25 C for 5 minutes and is heated and dried at 100 C for 5 minutes to prepare two types of samples. The mixed solvent is completely volatilized in both samples. FIG. 11 is the evaluation result.

Hydrophobic fine particles 9 applied in the seventh example are the hydrophobic silica particles and the silicone resin particles. Second coating agent 6*a* alternatively contains a mixed solvent of ethanol (40%) and water (58%) following the change of types of hydrophobic fine particles 9. Other than the above, forming conditions of coating film 1*a* are the same as those of the first example through the third example and the fifth example.

In the seventh example, a contact angle is 164 degrees both for air drying and heat drying. Rub fastness is "low" for air drying and "medium" for heat drying. Repellency is "high" both for air drying and heat drying. The rub fastness after rubbing test is "medium" both for air drying and heat drying. The hydrophobic silica particles each have repellency (super repellency) higher than that of the silicone resin particles. The silicone resin particles each have a mean particle size (2 to 10 μm) larger than that of the hydrophobic silica particles. As such, a volume of each of the silicone resin particles buried in ground layer 3 is increased. Additionally, the silicone resin particles are more resistant to rubbing than the hydrophobic silica particles. A combination of the hydrophobic silica particles having the high repellency and the silicone resin particles having the high rub fastness forms coating film 1*a* having the high repellency before the rubbing test and a medium repellency after the rubbing test.

Coating film 1*a* according to the second embodiment has following effects in addition to the effects of (1) through (8) by the first embodiment.

(9) Coating film 1*a* may contain at least two types of hydrophobic fine particles 9 of different mean particle sizes. According to such a configuration, a part of each of second hydrophobic fine particles 9*b* of large mean particle size has a contact area with ground layer 3 larger than that of each of first hydrophobic fine particles 9*a* of small mean particle size. First hydrophobic fine particles 9*a* of small mean particle size are inserted between second hydrophobic fine particles 9*b* of large mean particle size, then a percentage of an exposed area of ground layer 3 in an entire area of ground layer 3 is reduced. Thus, two types of hydrophobic fine particles 9 are more likely to control the separation of hydrophobic fine particles 9 from ground layer 3 than only one type of hydrophobic fine particles 9 and the rub fastness is increased, resulting in coating film 1*a* of lasting repellency.

The present invention has been described with reference to the embodiments. As will be understood by the skilled person, the embodiments are only examples, and each component or each processing procedure included in the embodiments may be variously combined as variants, and the variants are included in the scope of the present invention.

INDUSTRIAL APPLICABILITY

A coating film according to the present invention, compared to conventional coating films, not only controls reduction in repellency of hydrophobic fine particles but also increases rub fastness of the coating film. Thus, the coating film may be useful for products or components requiring the repellency and the rub fastness.

REFERENCE MARKS IN THE DRAWINGS

1 coating film
1*a* coating film
2 coating agent
3 ground layer
4 first coating agent
5 upper layer
5*a* upper layer
6 second coating agent
6*a* second coating agent
9 hydrophobic fine particle
9*a* first hydrophobic fine particle
9*b* second hydrophobic fine particle
10 target object
101 coating film
103 ground layer
109 hydrophobic fine particle
110 target object
201 coating film
203 covering film
401 coating film
403 covering film
501 coating film

The invention claimed is:

1. A coating film comprising:
a ground layer containing a thermoplastic resin; and
an upper layer containing a hydrophobic fine particle, the upper layer being formed on a surface of the ground layer;
wherein the hydrophobic fine particle includes a part buried in the ground layer,
wherein the hydrophobic fine particle includes first hydrophobic fine particles and second hydrophobic fine particles,
a mean particle size of the second hydrophobic fine particles is larger than a mean particle size of the first hydrophobic fine particles,
each of the second hydrophobic fine particles has a specific gravity smaller than a specific gravity of each of the first hydrophobic fine particles wherein the first hydrophobic fine particles are hydrophobic silica particles, and the second hydrophobic fine particles are silicone resin particles.

2. The coating film according to claim 1,
wherein the thermoplastic resin contains an acid modified chlorinated polyolefin.

3. The coating film according to claim 1, wherein the hydrophobic fine particle has a smooth spherical shape.

4. The coating film according to claim 1, wherein the first hydrophobic fine particles have repellency higher than repellency of the second hydrophobic fine particles.

5. The coating film according to claim 1, wherein the mean particle size of the hydrophobic silica particles is between 5 nm and 50 nm, and the mean particle size of the silicone resin particles is between 0.5 μm and 20 μm.

* * * * *